(12) United States Patent
Schoenek et al.

(10) Patent No.: US 8,876,655 B2
(45) Date of Patent: Nov. 4, 2014

(54) FRICTION LAUNCH STRATEGY FOR A MOTOR VEHICLE POWERTRAIN

(75) Inventors: Norman Schoenek, Novi, MI (US); Min-Joong Kim, Troy, MI (US); Hong Yang, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 337 days.

(21) Appl. No.: 13/325,865

(22) Filed: Dec. 14, 2011

(65) Prior Publication Data

US 2012/0178585 A1 Jul. 12, 2012

Related U.S. Application Data

(60) Provisional application No. 61/432,141, filed on Jan. 12, 2011.

(51) Int. Cl.
| | | |
|---|---|---|
| *B60W 10/02* | (2006.01) | |
| *B60W 10/08* | (2006.01) | |
| *B60W 10/06* | (2006.01) | |
| *B60W 10/115* | (2012.01) | |
| *B60W 30/192* | (2012.01) | |
| *F16H 61/00* | (2006.01) | |

(52) U.S. Cl.
CPC ....... *B60W 10/08* (2013.01); *B60W 2510/0638* (2013.01); *B60W 2710/081* (2013.01); *B60W 2710/0644* (2013.01); *F16H 61/0028* (2013.01); *B60W 10/115* (2013.01); *B60W 10/02* (2013.01); *B60W 30/192* (2013.01); *Y10S 903/93* (2013.01); *Y10S 903/946* (2013.01)
USPC ........ 477/5; 477/19; 477/77; 477/80; 477/99; 477/180; 903/930; 903/946

(58) Field of Classification Search
USPC ............ 477/5, 19, 70, 77, 79, 80, 83–86, 90, 477/91, 99, 167, 180, 181; 475/5, 151; 903/902, 930, 946
See application file for complete search history.

*Primary Examiner* — Jacob S Scott

(57) ABSTRACT

A control strategy for launching a motor vehicle includes using an electric motor to provide high torque at low speeds during synchronization of launch clutches. An internal combustion engine is started and connected with the electric motor to provide additional torque capacity. Selective engagement and disengagement of an engine disconnect clutch prevents the engine start from interfering with the motor vehicle launch.

20 Claims, 4 Drawing Sheets

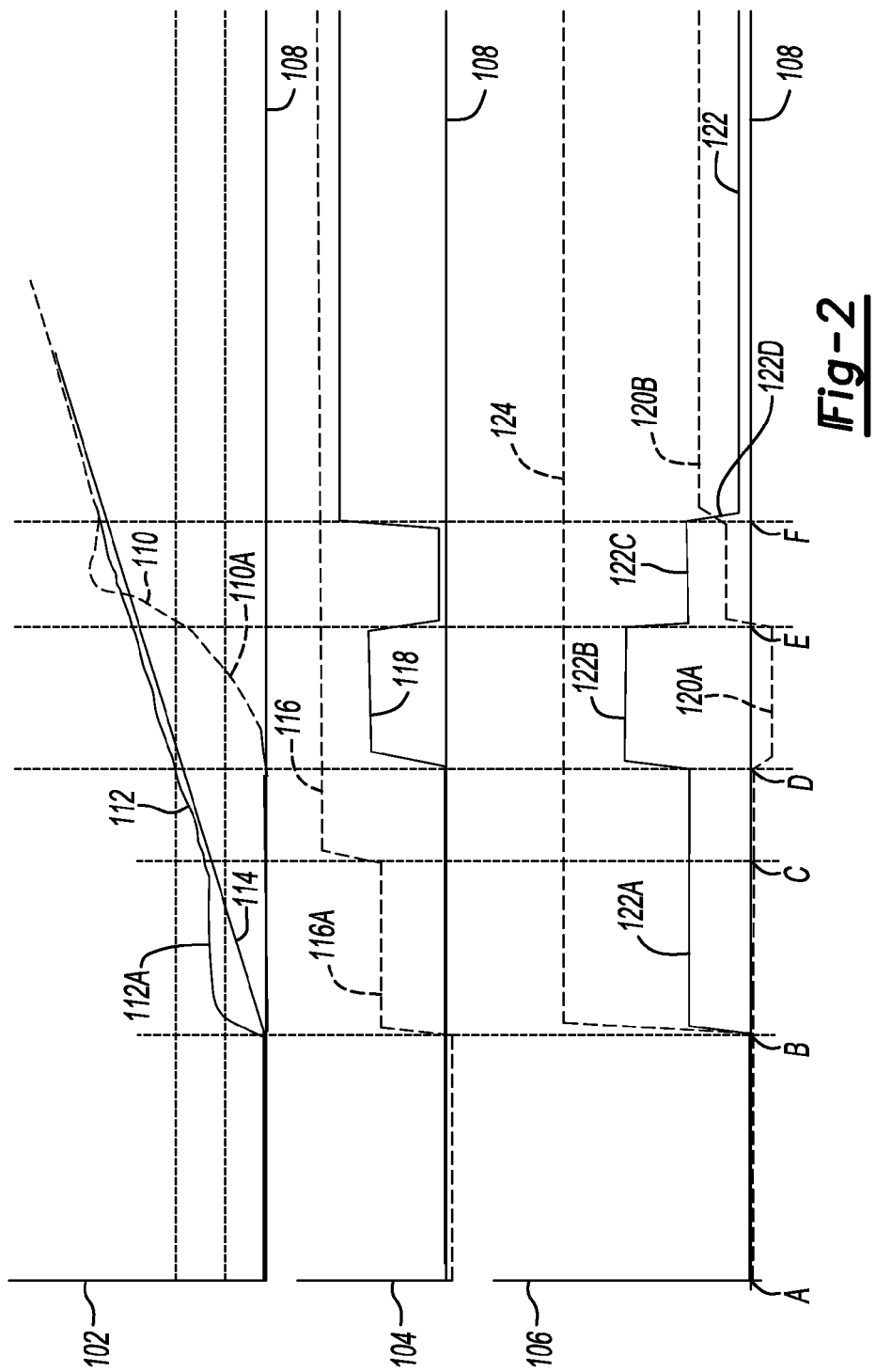

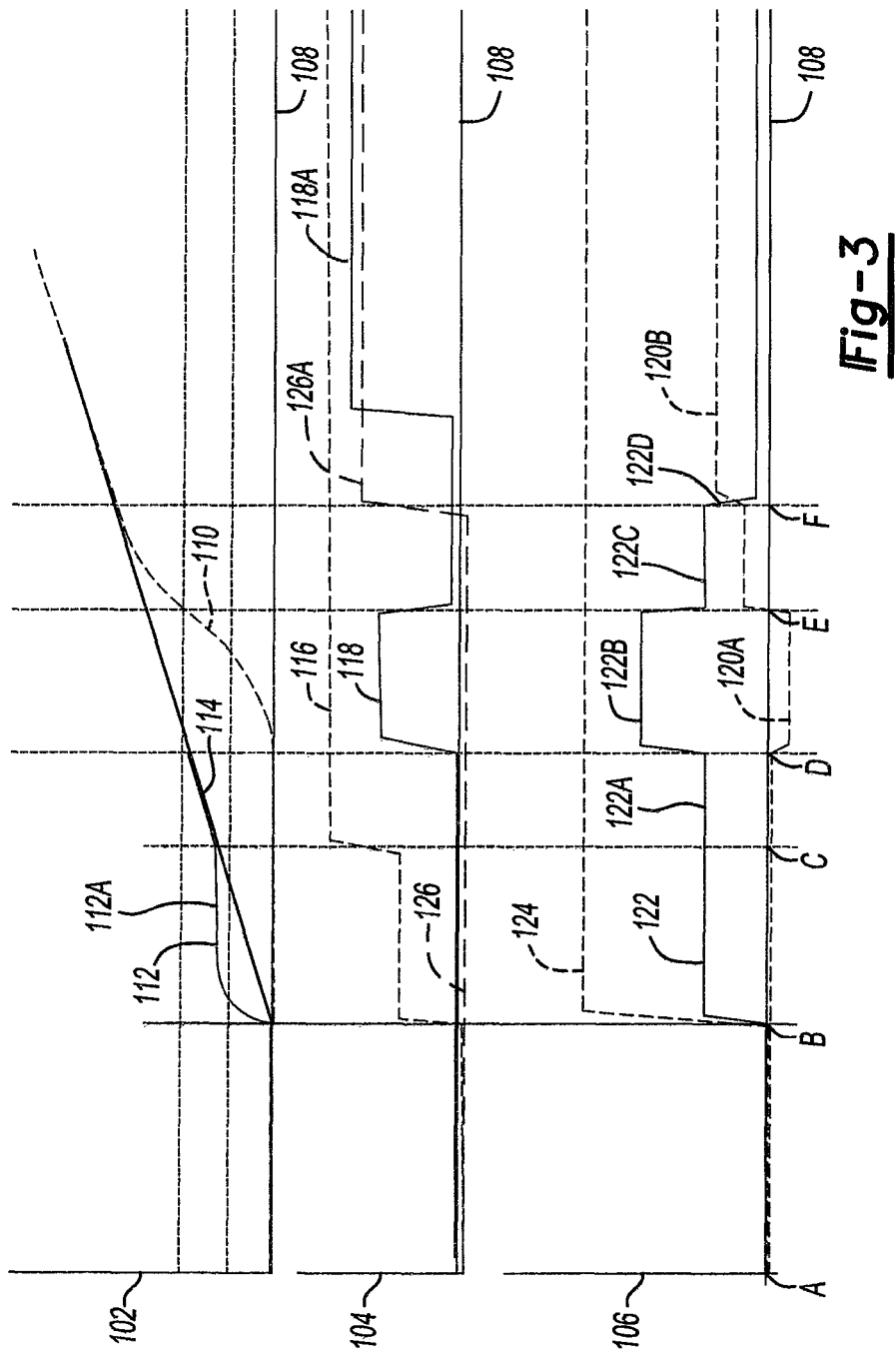

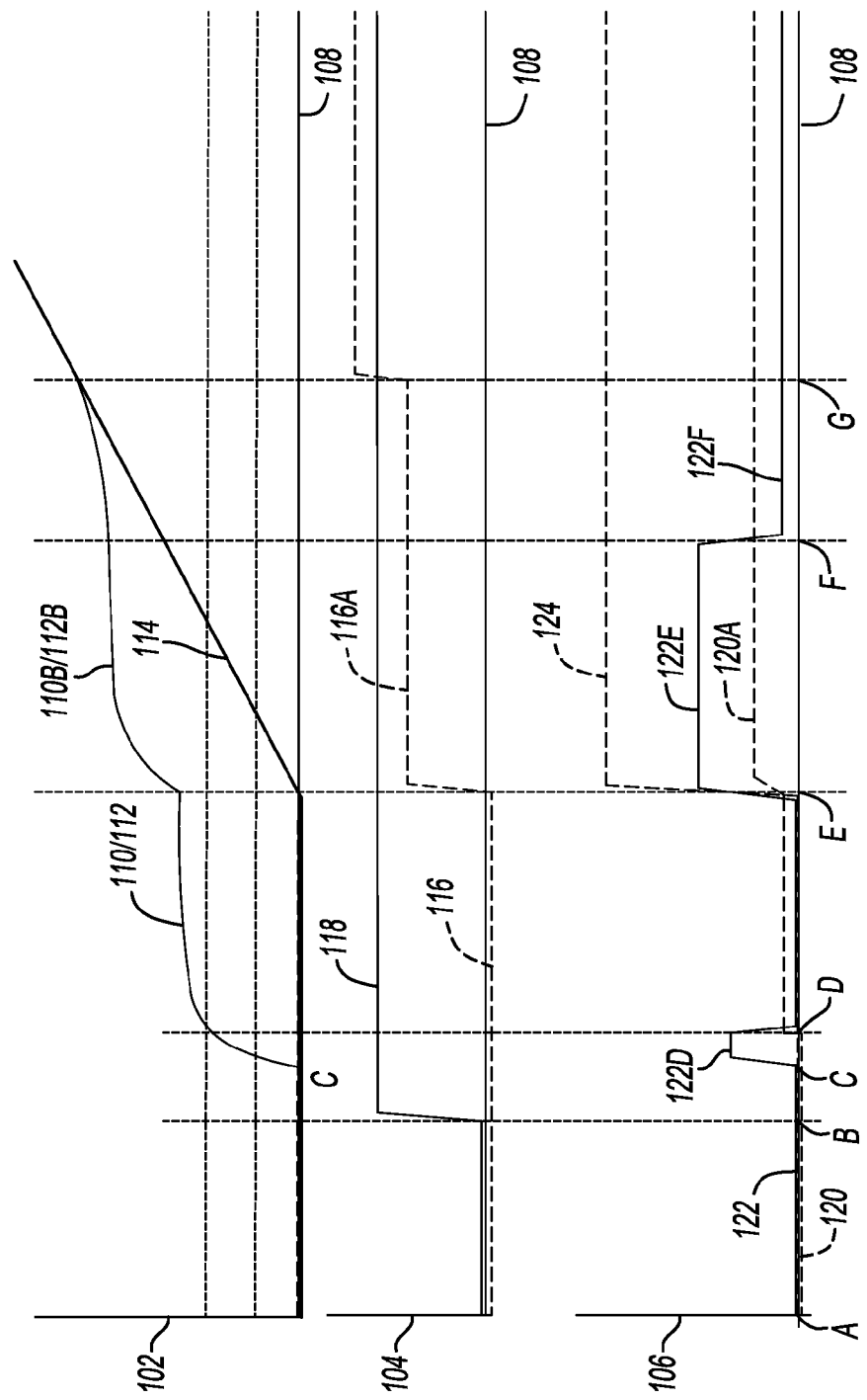

FRICTION LAUNCH STRATEGY FOR A MOTOR VEHICLE POWERTRAIN

CROSS-REFERENCE

This application claims the benefit of U.S. Provisional Application No. 61/432,141, filed Jan. 12, 2011. The entire contents of the above application are incorporated herein by reference.

FIELD

The present disclosure relates to a friction launch strategy for a starting device for an automatic transmission and more particularly to a friction launch strategy using an electric motor.

BACKGROUND

The statements in this section merely provide background information related to the present disclosure and may or may not constitute prior art.

Extensive engineering and design effort is currently directed to hybrid powertrains for motor vehicles, especially passenger cars. One of the most promising and active areas involves the addition of an electric motor and associated electronic controller to a motor vehicle powertrain to supplement torque for launches in order that a smaller internal combustion engine may be utilized in the vehicle. Lower horsepower and smaller displacement engines routinely provide improved fuel economy over larger engines and, when supplemented by an electric motor for vehicle launch, provide entirely satisfactory overall performance.

Accordingly, many hybrid powertrains begin as adaptations of conventional and existing powertrains utilizing an internal combustion engine and a transmission having a torque converter and multiple planetary gear assemblies. Into this powertrain is added an electric motor and an appropriate launch and disconnect clutch. Frequently, the torque converter is removed. The addition is not without significant challenges, including launch strategies that minimize wear and heat losses with launch clutches.

The present invention is directed to a launch strategy for a hybrid powertrain which addresses and solves the above-delineated challenges.

SUMMARY

A control strategy for launching a motor vehicle includes using an electric motor to provide high torque at low speeds during synchronization of launch clutches. An internal combustion engine is started and connected with the electric motor to provide additional torque capacity. Selective engagement and disengagement of an engine disconnect clutch prevents the engine start from interfering with the motor vehicle launch.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a graph illustrating an embodiment of a launch strategy for the powertrain;

FIG. 3 is a graph illustrating another embodiment of a launch strategy for the powertrain; and FIG. 4 is a graph illustrating still another embodiment of a launch strategy for the powertrain.

DETAILED DESCRIPTION

Figure 1:
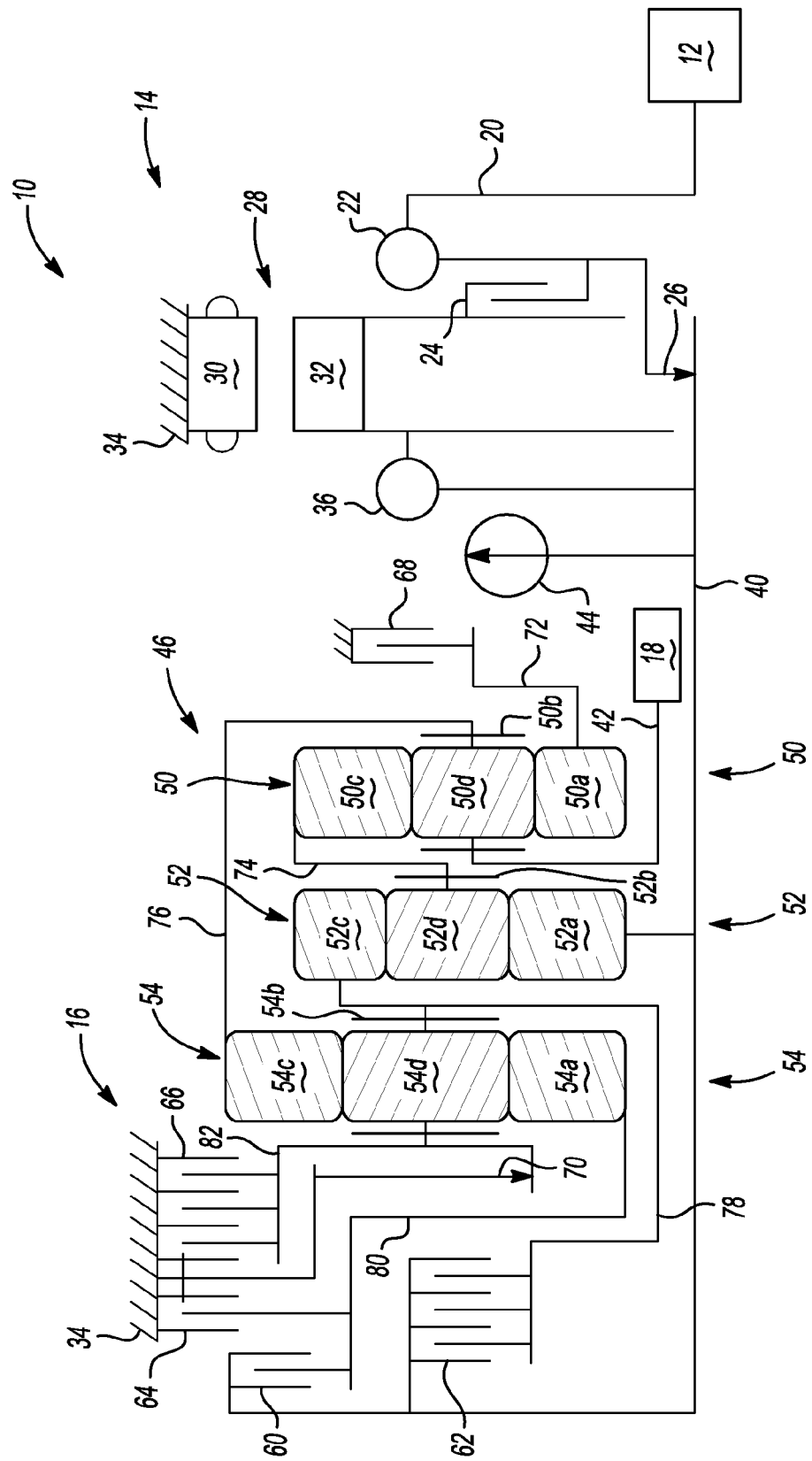
FIG. 1 is a diagrammatic view of an embodiment of a powertrain for a motor vehicle.

The following description is merely exemplary in nature and is not intended to limit the present disclosure, application, or uses.

With reference to FIG. 1, an exemplary powertrain for a motor vehicle is generally indicated by reference number 10. The powertrain 10 includes an engine 12 and an electric motor module 14 that supplies a driving torque to a transmission 16 which supplies various gear or speed ratios to a final drive unit 18. The engine 12 may be a conventional internal combustion engine or an electric engine, or any other type of prime mover, without departing from the scope of the present disclosure. The engine 12 supplies a driving torque to a flexplate or other connecting device 20. The flexplate 20 is coupled to the electric motor module 14.

The electric motor module 14 includes a first damper 22, a disconnect clutch 24, a one-way clutch 26, an electric motor 28 and a second damper 36. The first damper 22 is connected to the flexplate 20. The first damper 22 is configured to absorb a portion of torque oscillations transmitted through the flexplate 20 from the engine 12. The first damper 22 may take various forms and have various properties without departing from the scope of the present disclosure, for example, first damper 22 and flexplate 20 may be combined to form a dual mass flywheel. The first damper 22 is connected to both the disconnect clutch 24 and to the one-way clutch 26. Alternatively, the one-way clutch 26 may be eliminated from the powertrain 10.

The disconnect clutch 24 is, in the example provided, a plate clutch that when applied transmits torque from the first damper 22 to the electric motor 28. However, it should be appreciated that various types of torque transmitting devices may be employed. The electric motor 28 generally includes a stator 30 and a rotor 32. The stator 30 includes a plurality of windings or phases and is secured to a ground, stationary member, or a transmission housing 34. The rotor 32 includes a plurality of magnets and/or ferromagnetic members and is disposed radially inwardly of the stator 30 and is interconnected for common rotation with the disconnect clutch 24. The stator 30 and the rotor 32 may take various forms and have various properties without departing from the scope of the present disclosure.

The transmission 16 generally includes a transmission input shaft 40, a transmission output shaft 42, a pump 44, and a clutch and gear arrangement 46. The transmission input shaft 40 is connected for common rotation with and is selectively driven by both the one-way clutch 26 and the rotor 32 of the electric motor module 14. In addition, the pump 44 is connected to and driven by the transmission input shaft 40. The pump 44 may be any positive displacement pump, such as a gerotor pump or a vane pump, operable to provide pressurized hydraulic fluid to both the transmission 16 and the electric motor module 14.

The gear and clutch arrangement 46 includes a plurality of planetary gear assemblies 50, 52, and 54 interconnected with a plurality of torque transmitting mechanisms 60, 62, 64, 66, 68, and 70. For example, the first planetary gear set 50 includes a sun gear member 50A, a planet gear carrier member 50B and a ring gear member 50C. The sun gear member 50A is connected for common rotation with a first shaft or interconnecting member 72. The ring gear member 50C is connected for common rotation with a second shaft or interconnecting member 74. The planet gear carrier member 50B rotatably supports a set of planet gears 50D (only one of which is shown) and is connected for common rotation with the transmission output shaft or member 42 and a third shaft or interconnecting member 76. The planet gears 50D are each configured to intermesh with both the sun gear member 50A and the ring gear member 50C.

The second planetary gear set 52 includes a sun gear member 52A, a planet carrier member 52B that rotatably supports a set of planet gears 52D and a ring gear member 52C. The sun gear member 52A is connected for common rotation with the transmission input shaft or member 40. The ring gear member 52C is connected for common rotation with a fourth shaft or interconnecting member 78. The planet carrier member 52C is connected for common rotation with the second shaft or interconnecting member 74. The planet gears 52D are each configured to intermesh with both the sun gear member 52A and the ring gear member 52C.

The third planetary gear set 54 includes a sun gear member 54A, a ring gear member 54C and a planet carrier member 54B that rotatably supports a set of planet gears 54D. The sun gear member 54A is connected for common rotation with a fifth shaft or interconnecting member 80. The ring gear member 54C is connected for common rotation with the third shaft or interconnecting member 76. The planet carrier member 54B is connected for common rotation with the fourth shaft or interconnecting member 78 and a sixth shaft or interconnecting member 82. The planet gears 54D are each configured to intermesh with both the sun gear member 54A and the ring gear member 54C.

The torque-transmitting mechanisms or clutches 60, 62 and brakes 64, 66, 68, 70 allow for selective interconnection of the shafts or interconnecting members, members of the planetary gear sets and the transmission housing. For example, the first clutch 60 is selectively engageable to connect the fifth interconnecting member 80 with the transmission input member 40. The second clutch 62 is selectively engageable to connect the fourth interconnecting member 78 with the transmission input member 40. The first brake 64 is selectively engageable to connect the fifth interconnecting member 80 to the stationary member or transmission housing 34 in order to restrict the member 80 from rotating relative to the stationary member or transmission housing 34. The second brake 66 is selectively engageable to connect the sixth interconnecting member 82 to the stationary member or transmission housing 34 in order to restrict the member 82 from rotating relative to the stationary member or transmission housing 34. The third brake 68 is selectively engageable to connect the first interconnecting member 72 to the stationary member or transmission housing 34 in order to restrict the member 72 from rotating relative to the stationary member or transmission housing 34. The fourth brake 70 is a one-way clutch that is selectively engageable to connect the sixth interconnecting member 82 to the stationary member or transmission housing 34 in order to restrict the member 82 from rotating relative to the stationary element or transmission housing 34 in a first rotational direction.

The transmission output shaft or member 42 is preferably continuously connected with the final drive unit or transfer case 18. The final drive unit 18 may include a differential, trans-axles, and wheels (not shown) for providing a final output torque.

With reference to FIG. 2 and with continued reference to FIG. 1, the operation of the powertrain 10 will now be described. In this example, the one-way clutch 26 is removed from the electrical motor module 14, as described above. FIG. 3 is a graph matching the engine 12, motor 28, and target output speeds on the vertical axis 102 to the engagement of the torque transmitting devices 26, 60, and 68 on the vertical axis 104 to the torque from the engine 12, the torque from the motor 28, and the torque on the input shaft 40 on the vertical axis 106 over time on the horizontal axis 108. The relative operating speed of the engine 12 over time is indicated by line 110. The relative operating speed of the electric motor 28 over time is indicated by line 112. The relative target speed of the motor vehicle, adjusted for the first or reverse gear ratio, over time is indicated by line 114. The relative engagement of the clutch 60 or the brake 68 over time is indicated by line 116. The relative engagement of the disconnect clutch 24 over time is indicated by line 118. The torque from the engine 12 over time is indicated by line 120. The torque from the electrical motor 28 over time is indicated by line 122. The torque output of the motor vehicle over time is indicated by line 124.

At time zero, indicated by point "A", the powertrain 10 is not running. At time "B", the powertrain 10 begins an electric launch where the electric motor 28 speeds up to a speed above the minimum pump speed needed to pressurize the transmission 14, indicated by line portion 112A. Since the pump 44 is directly driven by the motor 28, the transmission 14 is able to have pressurized hydraulic fluid for valve staging, clutch piston strokes, and component cooling and lubrication. The torque from the motor 28, line portion 122A, increases rapidly under the power of the electric motor 28. Also at time "B", the brake 66 is applied and either clutch 60 or brake 68 for a reverse or forward launch, respectively, is partially applied (i.e. allowed to slip), indicated by line portion 116A.

At time "C", the motor 28 matches the target speed of line 114. Between time "B" and "C" the applied clutch/brake 60, 68 is synchronized and is then fully applied at time "C". This corresponds also to vehicle launch, and accordingly the speed of the motor 28 is increased along the line 114 to drive the motor vehicle.

At time "D" the engine 12 starts and speeds up, indicated by line portion 110A, and the disconnect clutch 26 is partially applied (i.e. allowed to slip). This begins the synchronization between the engine 12 and the motor 28. To account for the parasitic loss in torque output, line portion 120A, due to the engine 12 start, the electric motor 28 torque output, line portion 122B, increases to keep the final output torque, line 124, constant.

At time "E" the engine 12 has reached the engine firing speed and the disconnect clutch is disengaged to disconnect the engine 12 from the electric motor 28. Torque parasitic losses due to the engine 12 also cease, and the motor 28 output torque drops at line portion 122C.

At time "F" the engine 12 speed matches the target speed, line 114, and the disconnect clutch is fully engaged, connecting the engine 12 and the motor 28 to the transmission 16. The output torque from the electric motor 28 continues to drop at line portion 122D as the speed of the electric motor 28 continues to increase, however, the engine torque at line 120B compensates for the drop, thereby maintaining the constant output torque at line 124.

By using the electric motor 28 to launch the vehicle, the launch clutch 60, 68 is allowed to synchronize at relatively low speeds while at relatively high torque levels, thereby decreasing the wear on the launch clutches and reducing friction heat losses and other parasitic losses that can reduce the efficiency of the powertrain 10.

Turning to FIG. 3, and with continued reference to FIG. 1, the operation of the powertrain 10 will be described with the one-way clutch 26. FIG. 3 is a graph similar to the graph of FIG. 2 and therefore like components and lines are indicated by like reference numbers. However, the engagement of the one-way clutch 26 is indicated by line 126. The launch strategy described in FIG. 2 is similar to that of FIG. 3. However, between times "E" and "F", the engine speed is actively controlled to prevent a speed greater than the target speed, line 114. This prevents the one-way clutch 26 from automatically engaging. Once the engine 12 speed has matched the target speed 114, the one-way clutch 26 automatically engages, indicated by line portion 126A. Therefore, the disconnect clutch 24 is not engaged at time "F" since the one-way clutch 26 has already engaged. The disconnect clutch 24 is later engaged at higher engine speeds, indicated by line portion 118A.

Turning to FIG. 4, and with continued reference to FIG. 1, the operation of the powertrain 10 will be described with or without the one-way clutch 26 during an engine start launch. FIG. 4 is a graph similar to the graph of FIG. 2 and therefore like components and lines are indicated by like reference numbers.

At time zero, indicated by point "A", the powertrain 10 is not running. At time "B", the engine disconnect clutch is engaged thereby coupling the electric motor 28 with the engine 12. At time "C", the electric motor 28 is started. Since the electric motor 28 is directly coupled to the engine 12, the engine 12 speeds up with the motor 28. This results in a torque spike from the motor 28, indicated by line portion 122D.

At time "D" the motor 28 and engine 12 reach the engine firing speed and the engine 12 is started. The torque from the motor 28 drops and the torque from the engine 12, line 120, increases. At time "E" the brake 66 is applied and either clutch 60 or brake 68 for a reverse or forward launch, respectively, is partially applied (i.e. allowed to slip), indicated by line portion 116A. The motor 28 and engine 12 speeds increase at line portions 110B/112B while the output torque 124 reaches a target value and the output torques from the motor 28 and engine 12 increase at line portions 122E and 120A, respectively. At time "F" the motor 28 torque begins to drop at line portion 122E due to the higher speed levels of the motor 28. At time "G", the engine 12 and motor 28 matches the target speed of line 114. Between time "F" and "G" the applied clutch/brake 60, 68 is synchronized and is then fully applied at time "G", corresponding to vehicle launch.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for controlling a powertrain in a motor vehicle, the powertrain having in series an engine connected to a disconnect clutch connected to an electric motor connected to a transmission and to a transmission pump, the transmission having at least one selectively engageable launch clutch for initiating a first or a reverse gear ratio, the method comprising:
   increasing a speed of the electric motor above a pump threshold speed;
   actuating the launch clutch to partially engage;
   actuating the launch clutch to fully engage when the speed of the electric motor approximately equals a target threshold speed;
   actuating the disconnect clutch to partially connect the engine with the electric motor when the speed of the electric motor approximately equals an engine start threshold speed;
   actuating the disconnect clutch to disconnect the engine from the electric motor when a speed of the engine reaches the engine start threshold speed;
   starting the engine; and
   actuating the disconnect clutch to connect the engine to the electric motor when the speed of the engine approximately equals the target threshold speed.

2. The method of claim 1 wherein the pump threshold speed is a speed of the electric motor required to produce a desired fluid pressure within the transmission.

3. The method of claim 1 wherein the target threshold speed is a target speed input to the transmission required to provide a requested output speed of the powertrain by a user of the motor vehicle.

4. The method of claim 1 wherein the engine start threshold speed is the speed of the electric motor sufficient to begin synchronization with the engine through the disconnect clutch.

5. The method of claim 1 wherein the target threshold speed increases over time at a steady rate.

6. The method of claim 5 further comprising increasing the speed of the electric motor over time to approximately match the target threshold speed over time when the launch clutch is actuated to fully engage.

7. The method of claim 1 wherein the transmission further includes a second selectively engageable launch clutch for initiating a first or a reverse gear ratio, and actuating the launch clutch to partially engage also includes actuating the second launch clutch to fully engage.

8. The method of claim 1 wherein the transmission further includes a one-way clutch disposed in parallel with the disconnect clutch, and further comprising controlling the speed of the engine after starting the engine to prevent the speed of the engine from exceeding the target threshold speed.

9. A method for controlling a powertrain in a motor vehicle, the powertrain having an engine with an engine output shaft connected to a disconnect clutch, an electric motor with a rotor connected to the disconnect clutch, and a transmission with a transmission input shaft connected to the rotor and to a transmission pump, the transmission having at least one selectively engageable launch clutch for initiating a first or a reverse gear ratio, the method comprising:
   increasing a speed of the rotor above a pump threshold speed;
   slipping the launch clutch;
   engaging the launch clutch when the speed of the rotor approximately equals a target threshold speed;
   slipping the disconnect clutch to partially connect the engine output shaft with the rotor when the speed of the rotor approximately equals an engine start threshold speed;
   disengaging the disconnect clutch to disconnect the engine output shaft from the rotor when a speed of the engine output shaft reaches the engine start threshold speed;
   starting the engine; and
   engaging the disconnect clutch to connect the engine output shaft to the rotor when the speed of the engine approximately equals the target threshold speed.

10. The method of claim 9 wherein the pump threshold speed is a speed of the rotor and the transmission input shaft required to produce a desired fluid pressure within the transmission.

11. The method of claim 9 wherein the target threshold speed is a target speed of the transmission input shaft required to provide a requested output speed of the powertrain by a user of the motor vehicle.

12. The method of claim 9 wherein the engine start threshold speed is the speed of the rotor sufficient to begin synchronization with the engine output shaft through the disconnect clutch.

13. The method of claim 9 wherein the target threshold speed increases over time at a steady rate.

14. The method of claim 13 further comprising increasing the speed of the rotor over time to approximately match the target threshold speed over time when the launch clutch is engaged.

15. The method of claim 9 wherein the transmission further includes a second selectively engageable launch clutch for initiating a first or a reverse gear ratio, and slipping the launch clutch also includes engaging the second launch clutch.

16. The method of claim 9 wherein the transmission further includes a one-way clutch disposed in parallel with the disconnect clutch, and further comprising controlling the speed of the engine output shaft after starting the engine to prevent the speed of the engine output shaft from exceeding the target threshold speed.

17. A method for controlling a powertrain in a motor vehicle, the powertrain having an engine with an engine output shaft connected to a disconnect clutch, an electric motor with a rotor connected to the disconnect clutch, and a transmission with a transmission input shaft connected to the rotor and to a transmission pump, the transmission having a first and a second selectively engageable launch clutch for initiating a first or a reverse gear ratio, the method comprising:

increasing a speed of the rotor above a pump threshold speed;

slipping the first launch clutch;

engaging the second launch clutch;

engaging the first launch clutch when the speed of the rotor approximately equals a target threshold speed, wherein the target threshold speed increases over time;

increasing the speed of the rotor over time to approximately match the target threshold speed over time when the first launch clutch is engaged;

slipping the disconnect clutch to partially connect the engine output shaft with the rotor when the speed of the rotor approximately equals an engine start threshold speed;

disengaging the disconnect clutch to disconnect the engine output shaft from the rotor when a speed of the engine output shaft reaches the engine start threshold speed;

starting the engine; and engaging the disconnect clutch to connect the engine output shaft to the rotor when the speed of the engine approximately equals the target threshold speed.

18. The method of claim 17 wherein the pump threshold speed is a speed of the rotor and the transmission input shaft required to produce a desired fluid pressure within the transmission.

19. The method of claim 18 wherein the target threshold speed is a target speed of the transmission input shaft required to provide a requested output speed of the powertrain by a user of the motor vehicle.

20. The method of claim 19 wherein the engine start threshold speed is the speed of the rotor sufficient to begin synchronization with the engine output shaft through the disconnect clutch.

* * * * *